US 7,255,335 B2

(12) United States Patent
Muraoka et al.

(10) Patent No.: US 7,255,335 B2
(45) Date of Patent: Aug. 14, 2007

(54) FLUID-FILLED ACTIVE DAMPING APPARATUS

(75) Inventors: Mutsumi Muraoka, Kasugai (JP); Atsushi Muramatsu, Komaki (JP)

(73) Assignee: Tokai Rubber Industries, Ltd., Komaki-shi (JP)

( * ) Notice: Subject to any disclaimer, the term of this patent is extended or adjusted under 35 U.S.C. 154(b) by 108 days.

(21) Appl. No.: 11/151,234

(22) Filed: Jun. 14, 2005

(65) Prior Publication Data

US 2005/0275145 A1 Dec. 15, 2005

(30) Foreign Application Priority Data

Jun. 15, 2004 (JP) .............................. 2004-176631

(51) Int. Cl.
*F16F 5/00* (2006.01)
*F16F 9/00* (2006.01)
*F16F 13/00* (2006.01)
*F16F 15/00* (2006.01)
*F16M 5/00* (2006.01)

(52) U.S. Cl. .............................. 267/140.14; 267/140.15

(58) Field of Classification Search ........... 267/140.14, 267/140.15

See application file for complete search history.

(56) References Cited

U.S. PATENT DOCUMENTS

| | | | | |
|---|---|---|---|---|
| 4,877,225 A * | 10/1989 | Noguchi et al. | ........ | 267/140.14 |
| 5,439,204 A * | 8/1995 | Yamazoe et al. | ...... | 267/140.14 |
| 6,276,673 B1 * | 8/2001 | Hibi et al. | ............. | 267/140.14 |
| 6,315,277 B1 * | 11/2001 | Nagasawa | .............. | 267/140.14 |
| 6,422,546 B1 * | 7/2002 | Nemoto et al. | ........ | 267/140.14 |
| 6,527,262 B2 | 3/2003 | Hagino et al. | | |
| 6,565,072 B2 * | 5/2003 | Goto et al. | ............. | 267/140.14 |
| 6,972,500 B2 * | 12/2005 | Kon et al. | ..................... | 310/14 |
| 2004/0070126 A1 * | 4/2004 | Nemoto | ................. | 267/140.14 |
| 2005/0006830 A1 * | 1/2005 | Nemoto | ................. | 267/140.14 |
| 2005/0006831 A1 * | 1/2005 | Abe | ........................ | 267/140.15 |
| 2005/0017420 A1 * | 1/2005 | Nemoto et al. | ........ | 267/140.14 |
| 2005/0200061 A1 * | 9/2005 | Nemoto | ................. | 267/140.14 |
| 2006/0097437 A1 * | 5/2006 | Watanabe | ............... | 267/140.14 |

FOREIGN PATENT DOCUMENTS

| | | |
|---|---|---|
| JP | A 6-264955 | 9/1994 |
| JP | A 6-330980 | 11/1994 |
| JP | A 2000-213586 | 8/2000 |
| JP | A 2001-1765 | 1/2001 |
| JP | A 2001-304329 | 10/2001 |
| JP | A 2003-339145 | 11/2003 |
| JP | A 2004-36713 | 2/2004 |

* cited by examiner

*Primary Examiner*—Devon Kramer
(74) *Attorney, Agent, or Firm*—Oliff & Berridge, PLC

(57) ABSTRACT

A fluid-filled active damping apparatus having a pressure receiving chamber partially defined by a rubber elastic body connecting a first and second mounting member; an oscillation plate defining a part of the pressure receiving chamber, and supported in a displaceable fashion; an electromagnetic actuator disposed on one side of the oscillation plate remote from the pressure receiving chamber, with its output member connected to the oscillation plate; an equilibrium chamber partially defined by a flexible diaphragm; and an orifice passage connecting the pressure receiving chamber and equilibrium chamber. A rigid annular guide member is disposed about the oscillation plate with a slight gap therebetween, such that these members are mutually displaceable in the axial direction. The guide member is elastically supported by and connected to the second mounting member via an elastic support member.

8 Claims, 3 Drawing Sheets

FLUID-FILLED ACTIVE DAMPING APPARATUS

INCORPORATED BY REFERENCE

The disclosure of Japanese Patent Application No. 2004-176631 filed on Jun. 15, 2004 including the specification, drawings and abstract is incorporated herein by reference in its entirety.

BACKGROUND OF THE INVENTION

1. Field of the Invention

The present invention relates to an active damping apparatus of fluid-filled type, adapted to provide dynamic vibration damping action by means of actively controlling pressure fluctuations in a pressure receiving chamber having non-compressible fluid sealed therein, in cycle corresponding to the frequency of vibration to be damped. More particularly, the invention relates to a fluid-filled active damping apparatus of novel construction employing an electromagnetic actuator in order to control pressure fluctuations in the pressure-receiving chamber.

2. Description of the Related Art

A variety of types of damping apparatus known in the art for vibration in a component to be damped, such as a vehicle body, include an apparatus of vibration damping type that utilize damping action of a shock absorber, rubber elastic body or the like, and an apparatus of vibration isolation type that utilize the spring action of a coil spring, rubber elastic body or the like. However, all of these damping apparatus utilize passive vibration damping action. Thus, if the frequency or other characteristic of vibration to be damped changes, or if a higher level of vibration damping action is required, the known passive damping apparatus are difficult to adequately achieve the desired vibration damping effect.

In recent years, there have been developed and tested active damping apparatus that utilize an actuator to generate oscillation force in a cycle corresponding to the frequency of the vibration being damped, so as to actively reduce vibration. In this kind of active damping apparatus, a high degree of controllability is required in relation to the frequency and phase of the oscillation force generated by the actuator which generates the oscillation force. Thus, as the actuator there may be favorably employed, for example, an electromagnetic actuator comprising a coil and an output member such as an armature that receives driving force when current is passed through the coil, wherein the output exerted on the output member is controlled by means of the action of electromagnetic force or magnetic force by means of controlling current flow to the coil.

More specifically, an active damping apparatus of the above type, as taught for example in JP-A-2001-1765, includes a mounting assembly having a rubber elastic body elastically connecting a first mounting member and a second mounting member, a pressure receiving chamber partially defined by the rubber elastic body with a non-compressible fluid sealed therein to which an input vibration is applied, and adapted to receive, and an oscillation plate elastically supported in displaceable fashion, and partially defining the pressure receiving chamber. An electromagnetic actuator is disposed on a first side of the oscillation plate remote from the pressure-receiving chamber, and a coil which constitutes part of the actuator is supported fixedly by the second mounting member. To the oscillating plate, there is fixed an output member on which driving force is exerted by energizing the coil. By means of this arrangement, driving force is exerted on the oscillation plate by energizing the coil, causing excitation displacement of the oscillation plate. With this arrangement, the pressure in the pressure-receiving chamber can be actively controlled to produce vibration-damping action.

In an electromagnetic actuator employed in a fluid-filled active damping apparatus of this kind, in order to effectively achieve the desired vibration damping action, it is necessary that the oscillation force created by energizing the coil be produced consistently at a desired magnitude. By producing oscillation force of magnitude corresponding to input vibration in order to reduce dynamic spring constant on the basis of pressure fluctuations of the pressure receiving chamber being absorbed through dynamic excitation displacement of the oscillation plate for example, it is possible to appreciably improved control of vibration damping ability.

Thus, in an electromagnetic actuator of this kind it is necessary that the relative positional relationship of the output member to the coil be established with a high degree of accuracy. This is because while the magnitude of magnetic force or electromagnetic force produced in the output portion is intimately related to the magnitude of flux density at the location where the output member is disposed, flux density magnitude varies appreciably with relative position to (distance apart from) the coil which is the source of the magnetic field.

In the fluid-filled active damping apparatus of the construction described above, the oscillation plate is elastically supported by and positioned relative to the second mounting member via a support rubber elastic body of circular plate shape or annular plate shape, whereby displacement of the oscillation plate in the axial direction can be permitted on the basis of elastic deformation of the support rubber elastic body. Thus, there is a tendency for the support rubber elastic body to suffer from its fatigue relatively early, due to the elastic deformation produced repeatedly in the support rubber elastic body during displacement of the oscillation plate. When the support rubber elastic body has fatigued, created are a change in the support location of the oscillation plate, and accordingly in the relative position of the coil to the output member in the electromagnetic actuator, resulting in the problem of difficulty in consistently achieving the desired drive force and damping effect. Additionally, since excitation energy is consumed by deformation of the support rubber elastic body, there is the problem of lower drive efficiency of the actuator.

To meet this problem, as taught for example in JP-A-6-330980, it has been contemplated to form a through-hole in part of the wall of the pressure receiving chamber, and to dispose the oscillation plate displaceably accommodated within the through-hole, without needing the support rubber body connecting between the oscillation plate and the through hole. With this arrangement, the oscillation plate is supported without interposition of the support rubber elastic body mentioned previously, thus avoiding adverse effects of fatigue of the support rubber elastic body on driving of the oscillation plate.

However, in the fluid-filled active damping apparatus taught in JP-A-6-330980, there is a need for the gap between the opposed outer peripheral face of the oscillation plate and inner peripheral face of the through-hole to be made smaller in order to prevent leakage of pressure in the pressure receiving chamber to the outside through the through-hole while assuring good axial displacement of the oscillation plate within the through-hole. Thus, it is necessary to establish both the through-hole inside diameter dimension and the oscillation plate outside diameter dimension with a very high degree of precision, which presents the problem of difficulty in manufacture and maintenance.

Also, when the oscillation plate is induced to undergo drive displacement, at least part of the oscillation plate is likely to come into contact with the through-hole, due to the small size of the gap between the oscillation plate and the through-hole. Additionally, the oscillation plate is mounted on the output shaft of the electromagnetic actuator and is fitted into the through-hole during mounting of the electromagnetic actuator. Thus, any error (deviation) in mounting position of the electromagnetic actuator on the mounting assembly will easily result in the center axes of the oscillation plate and the through-hole being misaligned. Due to this misalignment of their center axes, the oscillation plate will tend to experience interference with the inner peripheral face of the through-hole, even where each of the components has high dimensional accuracy. Resultant contact of the oscillation plate and the through-hole poses the risk of producing a hammering noise, or of difficulty in achieving the desired oscillation force due to the difficulty of efficiently realizing drive displacement of the oscillation plate. Thus, an inherent problem is difficulty in consistently achieving drive of the oscillation plate, and difficulty in consistently exhibiting the intended vibration damping effect.

SUMMARY OF THE INVENTION

It is therefore one object of this invention to provide a fluid-filled active damping apparatus of novel construction, whereby the oscillation plate is induced to undergo drive displacement in a stable manner while preventing pressure leakage from the pressure receiving chamber so that the intended vibration damping action is consistently achieved, and whereby oscillation plate dimensions, output member installation location, and the like may be established without an excessive degree of exactitude, thus facilitating manufacture and maintenance.

The above and/or optional objects of this invention may be attained according to at least one of the following modes of the invention. The following modes and/or elements employed in each mode of the invention may be adopted at any possible optional combinations. It is to be understood that the principle of the invention is not limited to these modes of the invention and combinations of the technical features, but may otherwise be recognized based on the teachings of the present invention disclosed in the entire specification and drawings or that may be recognized by those skilled in the art in the light of the present disclosure in its entirety.

A first mode of the invention provides a fluid-filled active damping apparatus including: a first mounting member; a second mounting member; a rubber elastic body elastically connecting the first and second mounting members; a pressure receiving chamber filled with a non-compressible fluid, whose wall is partially defined by the rubber elastic body 16, and subjected to input of vibration; an oscillation plate defining an another portion of the wall of the pressure receiving chamber, and supported in a displaceable fashion; an electromagnetic actuator disposed on one side of the oscillation plate remote from the pressure receiving chamber, with an output member thereof connected to the oscillation plate, the oscillation plate being driven by means of current applied to the electromagnetic actuator to thereby control pressure in the pressure receiving chamber; a rigid annular guide member disposed about the oscillation plate with a slight gap interposed therebetween, such that the annular guide member is displaceable in the axial direction with respect to the oscillation plate; an elastic support member elastically interposed between and connected to the annular guide member and the second mounting member so that the annular guide member is elastically supported by and connected to the second mounting member via the elastic support member; an equilibrium chamber filled with the non-compressible fluid, whose wall is partially defined by a flexible diaphragm to readily permit change in volume; and an orifice passage for permitting a communication between the pressure receiving chamber and the equilibrium chamber.

In the fluid-filled active damping apparatus constructed according to this embodiment, the annular guide member is supported by and elastically connected to the second mounting member by the elastic support member. By means of this arrangement, even if the oscillation plate should interfere with the annular guide member, appreciable contact force and sliding resistance may be avoided on the basis of elastic deformation of the elastic support member. Accordingly, even in the event of dimensional error occurring during manufacture of the oscillation plate or the annular guide member, or misalignment of the oscillation plate and the annular guide member occurring during mounting of the electromagnetic actuating means onto the second mounting member, misoperation or damage caused by interference of the oscillation plate with the annular guide member is effectively avoided.

Additionally, since such problems which occur during interference of the oscillation plate with the annular guide member can be avoided with the help of elastic deformation of the elastic support member, it becomes possible as well to make sufficiently small the gap between the oscillation plate and the annular guide member. With this arrangement, leakage of pressure from the pressure-receiving chamber through the gap is reduced. Thus, the pressure of the pressure-receiving chamber can be effectively controlled by means of excitation of the oscillation plate by the electromagnetic actuator.

Further, by providing a smaller gap at the perimeter of the oscillation plate to reduce pressure leakage from the pressure receiving chamber, passive pressure fluctuations can be produced effectively in the pressure receiving chamber as well. It is accordingly possible to increase fluid flow through the orifice passage, and to improve the attendant vibration damping performance.

Also, very small pressure fluctuations in the pressure receiving chamber can be absorbed and reduced on the basis of elastic deformation of the elastic support member. Thus, it becomes possible to passively suppress, through elastic deformation of the elastic support member, high dynamic spring constant occurring during input of small-amplitude vibration in a frequency range higher than the tuning frequency of the orifice passage, for example.

In this embodiment in particular, since the elastic support member is formed around the annular guide member, effective surface area is advantageously assured. Additionally, construction is simpler as compared to the case where movable plate or other discrete element is installed for absorbing pressure fluctuations in the pressure-receiving chamber.

A second mode of the invention provides a fluid-filled active damping apparatus according to the first mode, wherein the elastic support member extends with generally constant cross-sectional shape around an entire circumferential direction about an center axis of the annular guide member.

In this embodiment, the spring characteristics of the elastic support member are made generally uniform about the entire circumference. Thus, it can stably support the annular guide member. In particular, in the event that a pressure fluctuation of the pressure receiving chamber is exerted on the elastic support member, axial misalignment of the annular guide member in association with deformation of the elastic support member is prevented, and adverse effects on axial displacement of the oscillation plate are avoided.

Additionally, thermal shrinkage occurring during molding of the elastic support member or thermal deformation occurring after molding, for example, are generally uniform about the center axis as well. Thus, axial misalignment of the oscillation plate and the annular guide member caused by thermal deformation of the elastic support member can be reduced, and dimensional accuracy of the gap between the two components and operational stability of the oscillation plate may be improved.

A third mode of the invention provides a fluid-filled active damping apparatus according to the first or second mode, wherein at least one of an outer peripheral face of the oscillation plate and an inner peripheral face of the annular guide member which are situated in opposition to each other with the slight gap therebetween, is formed of synthetic resin material.

In this embodiment, as compared to the case where both the outer peripheral face of the oscillation plate and the inner peripheral face of the annular guide member are formed of metal material, low rebound capability may be better assured, and noise occurring with contact between the oscillation plate and the annular guide member may be suppressed. Also, as compared to the case where the inner and outer peripheral faces are formed of rubber material, it is easier to assure low friction and smooth sliding. Specifically, by fabricating at least one opposing face selected from the outer peripheral face of the oscillation plate and the inner peripheral face of the annular guide member, even better actuated displacement of the oscillation plate may be realized.

There are no particular limitations as to the type of synthetic resin material, it being possible to employ various known types of material such as polyacetal, polytetrafluoroethylene, polyester, polycarbonate, modified polyphenylene oxide, epoxy resin, silicone resin, polyarylate, polyphenylene sulfide, polyimide resin, and the like. In this embodiment in particular, it is preferable to employ synthetic resin material having excellent dimensional stability and impact resistance. Where for example the annular guide member is integrally vulcanization molded with the elastic support member, it is preferable to use synthetic resin material with excellent heat resistance as well.

A fourth mode of the invention provides a fluid-filled active damping apparatus according to any one of the first through third modes, wherein the annular guide member and the elastic support member are formed independently from each other, and is provided a fastening mechanism able to affix the outer peripheral edge of the annular guide member and the inner peripheral edge of the elastic support member mated with each other, utilizing the elastic behavior of the elastic support member.

In this embodiment, the annular guide member is attached to the elastic support member after the elastic support member has been molded by vulcanization of a rubber material, making it possible to select the material for the annular guide member without considering heat resistance as regards the vulcanization molding temperature of the elastic support member.

A fifth mode of the invention provides a fluid-filled active damping apparatus according to any one of the first through fourth modes, wherein the oscillation plate is of a construction integrally having a main plate portion of generally disk shape, and a rim portion of tubular shape rising up in the axial direction at the outer peripheral edge of the main plate portion.

Minimizing the mass of the oscillation plate is effective in terms of reducing the inertia of the excitation member, i.e. the oscillation plate, to give it a high level of controllability, particularly when excited in the high frequency range. On the other hand, in terms of assuring stability and reliability during displacement of the oscillation plate, as well as fluid flow resistance through the slight gap between the opposing faces of the oscillation plate outer peripheral face and the annular guide member inner peripheral face, it is preferable for the gap between these opposing faces to be fairly large in the axial direction. With this embodiment, both qualities can be met.

A sixth mode of the invention provides a fluid-filled active damping apparatus according to any of the first through fifth modes, wherein a natural frequency of the elastic support member is set to a frequency range higher than a tuning frequency of the orifice passage.

Typically, a conventional fluid-filled damping apparatus typically suffers from the problem that in response to input vibration of a frequency range higher than the tuning frequency of the orifice passage, the orifice passage becomes substantially blocked due to anti-resonance action of fluid through the orifice passage. This may create the risk of considerable pressure fluctuations occurring in the pressure receiving chamber. According to the construction of this mode, the considerable pressure fluctuations in the pressure receiving chamber during input of vibration in the high frequency range is avoided by means of elastic deformation of the elastic support member, improving vibration damping action against high frequency vibration.

A seventh mode of the invention provides a fluid-filled active damping apparatus according to any one of the first through sixth modes, wherein the flexible film is affixed fluid-tightly at an outer peripheral edge thereof to the second mounting member, and a connector rod connecting the output member of the electromagnetic actuator and the oscillation plate is disposed fluid-tightly passing through a center portion of the flexible film.

According to this mode, it is possible, while assuring fluid-tightness of the pressure receiving chamber and the equilibrium chamber, to dispose the electromagnetic actuating to the outside of the fluid sealed zone, assuring a greater degree of freedom in design of the installation space thereof.

A eighth mode of the invention provides a fluid-filled active damping apparatus according to any one of the first through seventh modes, wherein an annular fastener member is disposed to an outer peripheral side of the annular guide member and spaced apart therefrom, and wherein the annular guide member is affixed to an inner peripheral edge of the elastic support member, and the annular fastener member is affixed to an outer peripheral edge of the elastic support member so that the annular fastener member is fluid-tightly fastened to the second mounting member.

In this mode, the outer peripheral edge of the elastic support member can be fastened fluid-tightly to the second mounting member.

BRIEF DESCRIPTION OF THE DRAWINGS

The forgoing and/or other objects features and advantages of the invention will become more apparent from the following description of a preferred embodiment with reference to the accompanying drawings in which like reference numerals designate like elements and wherein.

DETAILED DESCRIPTION OF PREFERRED EMBODIMENTS

Figure 1:
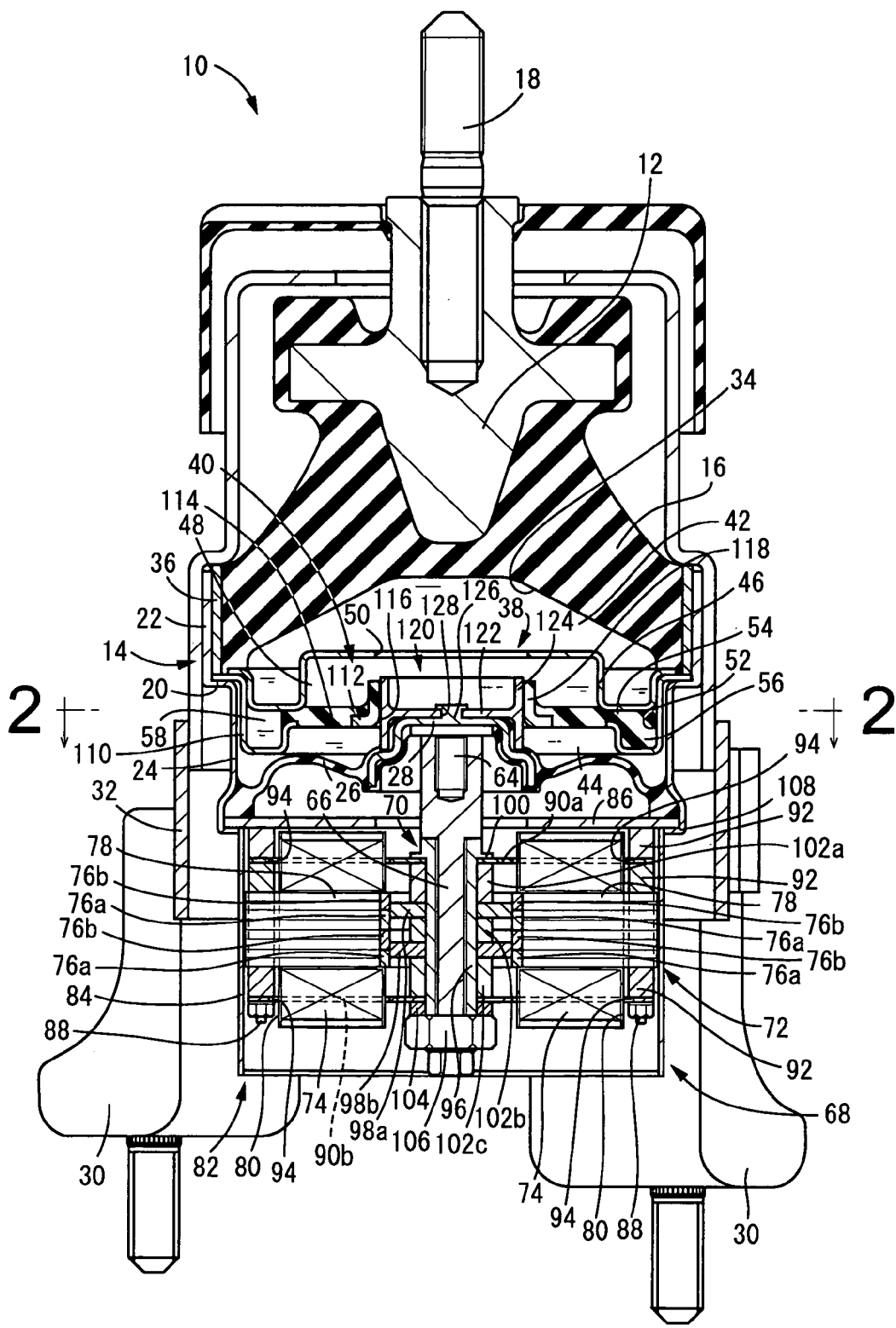
FIG. 1 is an elevational view in axial or vertical cross section of an automobile engine mount of construction according to one preferred embodiment of the invention.
Figure 2:
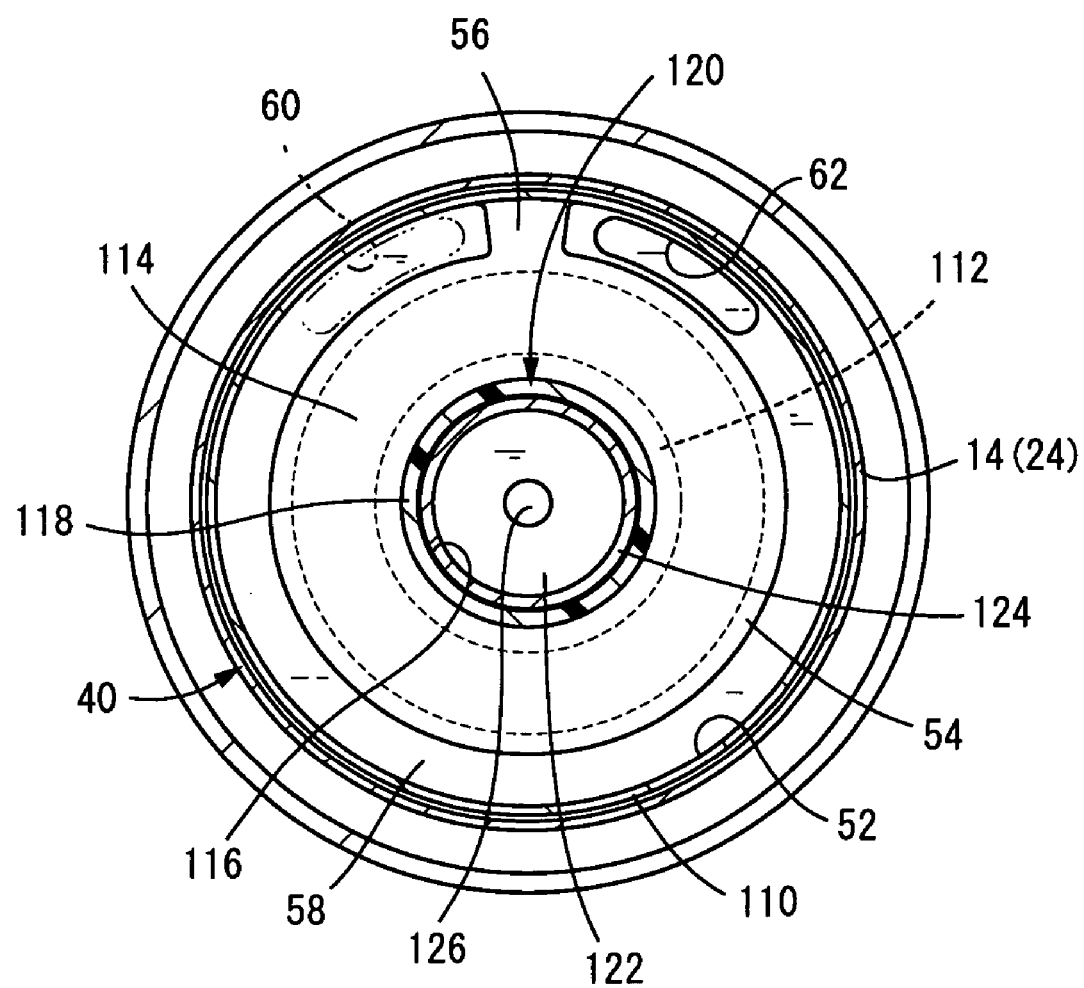
FIG. 2 is a cross sectional view of the engine mount of FIG. 1, taken along line 2-2 of FIG. 1.

FIGS. 1 and 2 show an automotive engine mount 10 of construction according to one preferred embodiment of a present invention relating to a fluid-filled active damping apparatus. The engine mount 10 has a construction wherein a metallic first mounting member 12 and a metallic second mounting member 14 are disposed apart from one another by a predetermined distance, and are elastically connected by means of a rubber elastic body 16 interposed therebetween. The first mounting member 12 and the second mounting member 14 are adapted to be fixed respectively to a vehicle body side and to a power unit side, so that the power unit is supported on the body in a vibration-damped manner. During installation on the automobile, the rubber elastic body 16 undergoes elastic deformation due to the weight of the power unit, whereby the first mounting member 12 and the second mounting member 14 undergo relative displacement by a predetermined extent in the proximate direction. The principal vibrations targeted for damping are input in the generally vertical direction in FIG. 1. In the description hereinbelow, unless indicated otherwise, vertical direction refers to the vertical direction in FIG. 1.

More specifically, the first mounting member 12 has a generally inverted truncated cone shape. An upwardly projecting mounting bolt 18 is integrally formed on the large-diameter end face thereof. The first mounting member 12 is fixedly mounted, for example, on the power unit side, by means of the mounting bolt 18.

The second mounting member 14 has a large-diameter, generally stepped tubular shape. The second mounting member 14 has horizontally (sideways in FIG. 1) flared stepped portion 20 situated at medial location in an axial direction thereof, with a large-diameter portion 22 and a small-diameter portion 24 situated to either side of the stepped portion 20. While not shown in the drawing, a sealing rubber layer is formed covering the inner circumferential face of the second mounting member 14.

At the bottom opening of the second mounting member 14, there is disposed a flexible diaphragm 26 of generally disk shape, composed of an easily deformable thin rubber film. By means of vulcanization bonding the outer peripheral edge of the diaphragm 26 to the bottom rim of the second mounting member 14, the bottom opening of the second mounting member 14 is provided with fluid-tight closure. The center portion of the diaphragm 26 includes a metallic connector member 28 of generally inverted cup shape vulcanization bonded thereto. That is, the diaphragm 26 is formed as an integrally vulcanization molded component with the second mounting member 14 and the connector member 28. To the outer periphery of the second mounting member 14 is fastened a support cylinder member 32 of tubular shape having a plurality of fastener legs 30 that extend downward. By means of bolting these fastener legs 30 to the vehicle body side (not shown), the second mounting member 14 is fastened to the car body via the support cylinder member 32. The first mounting member 12 is disposed on generally the same center axis as the second mounting member 14, but spaced above it. The rubber elastic body 16 is disposed between the first mounting member 12 and the second mounting member 14.

The rubber elastic body 16 has a generally truncated cone shape overall, with a conical shaped recess 34 open in the large-diameter end face thereof. At the small-diameter end of the rubber elastic body 16 the first mounting member 12 is inserted and vulcanization bonded thereto. On the outside peripheral face at the large-diameter end of the rubber elastic body 16 is vulcanization bonded a metal sleeve 36 of large-diameter, generally tubular shape as a medial sleeve. That is, the rubber elastic body 16 is an integrally vulcanization molded component comprising the first mounting member 12 and a metal sleeve 36.

The metal sleeve 36 of the integrally vulcanization molded component of the rubber elastic body 16 is inserted into the large-diameter portion 22 of the second mounting member 14. By means of press-fitting the large diameter portion 22 of the metal sleeve 36 or subjecting the large-diameter portion 22 to a diameter reduction process such as drawing or the like, the rubber elastic body 16 is securely fixed fluid-tightly to the second mounting member 14. With this arrangement, the bottom opening of the second mounting member 14 is provided with fluid-tight closure, so that the area between the diaphragm 26 and the rubber elastic body 16 within the second mounting member 14 is isolated fluid-tightly from the outside. Disposed within this isolated zone are a metallic orifice member 38 and a partition wall member 40.

The orifice member 38 and the partition wall member 40 are of generally disk shape. The partition wall member 40 and orifice member 38 are inserted in the axial direction in this order from the opening of the large diameter portion 22 of the second mounting member 14, with the outer peripheral edge of the partition wall member 40 superimposed against the stepped portion 20 of the second mounting member 14, and the outer peripheral edge of the orifice member 38 against the outer peripheral edge of the partition wall member 40. The metal sleeve 36 is secured press-fit into the large-diameter portion 22, and the large-diameter portion 22 and small-diameter portion 24 of the second mounting member 14 are subjected to a diameter reduction process. With this arrangement, the orifice member 38 and the partition wall member 40 are mated fluid-tightly with the second mounting member 14, in association with the outer peripheral edge of each being superimposed fluid-tightly onto the rubber elastic body 16 and a seal rubber layer formed covering the inner circumferential face of the second mounting member 14.

By fluid-tightly dividing the space between the rubber elastic body 16 and the diaphragm 16 by means of the orifice member 38 and the partition wall member 40, there is formed to one side of the orifice member 38 and the partition wall member 40 (the upper side in FIG. 1), a primary fluid chamber 42 whose wall is partially constituted by the rubber elastic body 16 and which gives rise to pressure fluctuations on the basis of elastic deformation of the rubber elastic body 16 by means of vibration input across the first mounting member 12 and the second mounting member 14. Also, there is formed to the other side (the lower side in FIG. 1), an equilibrium chamber 44 whose wall is partially constituted by the diaphragm 26 and which readily undergoes change in volume on the basis of elastic deformation of the diaphragm 26. A non-compressible fluid is sealed within the primary fluid chamber 42 and the equilibrium chamber 44. As the non-compressible fluid, there may be employed water, alkylene glycol, polyalkylene glycol, silicone oil, or the like. Preferably, in order to effectively achieve vibration damping action based on fluid action, e.g. resonance action, of the fluid a low-viscosity fluid of 0.1 Pa·s or lower will be employed. Sealing of fluid within the primary fluid chamber 42 and the equilibrium chamber 44 may be accomplished, for example, by assembling the integrally vulcanization molded component of the rubber elastic body 16 furnished with the first mounting member 12 and the metal sleeve 36, the integrally vulcanization molded component of the diaphragm 26 furnished with the second mounting member 14 and the connector member 28, the orifice member 38, the partition wall member 40 and so on together in the above manner while the components are immersed in non-compressible fluid.

In the center portion of the orifice member 38, there is formed a center wall portion 46 of inverted cup shape projecting towards the primary fluid chamber 42 side. The bottom end (face) of the orifice member 38 is superimposed fluid-tightly against the diametrically medial portion of the partition wall member 40 (more specifically, a seal rubber 54 and divider rubber 56 described later), with the bottom opening of the center wall portion 46 provided with fluid-tight closure by the partition wall member 40 thereby forming between the center wall portion 46 and the partition wall member 40 an auxiliary fluid chamber 48 having non-compressible fluid sealed therein. The center of the upper base portion of the center wall portion 46 is perforated by a large-diameter through-hole 50. With this arrangement, the primary fluid chamber 42 and the auxiliary fluid chamber 48 are disposed in communication with one another, permitting fluid flow through the through-hole 50 between the primary fluid chamber 42 and the auxiliary fluid chamber 48. As will be apparent from the above, in this embodiment, the pressure-receiving chamber for vibration input, partially defined by the rubber elastic body 16, is constituted so as to include the primary fluid chamber 42 and the auxiliary fluid chamber 48. In this embodiment, the passage length and passage cross-sectional area are established and modified such that, based on flow action, e.g. resonance action, of fluid caused to flow through the through-hole 50, there is produced effective vibration damping action of medium-frequency, medium-amplitude vibration on the order of ±0.1-0.25 mm and 20-40 Hz, such as idling vibration for example.

In proximity to the outer peripheral edge of the partition wall member 40, there is formed an upwardly-opening circumferential groove 52, that extends with a generally unchanging recessed area over a predetermined length in the circumferential direction (e.g. length approximately once around the circumference). The inside peripheral edge of the circumferential groove 52 is covered by an upwardly-projecting seal rubber 54 of generally annular shape in plane view, formed substantially all the way around the circumference. At one location on the circumference of the circumferential groove 52 is packed a divider rubber 56 integrally formed with the seal rubber 54.

The peripheral wall of the orifice member 38 is fitted into the peripheral wall of the partition wall member 40, and the bottom wall (lower end) of the orifice member 38 is superimposed fluid-tightly against the seal rubber 54 and the divider rubber 56 of the partition wall member 40, whereby the circumferential groove 52 is provided with fluid-tight closure by the orifice member 38. With this arrangement, there is formed to the outer peripheral side between the orifice member 38 and the partition wall member 40 an orifice passage 58 that extends over a predetermined length in the circumferential direction (e.g. just short of approximately once around the circumference). A first end of this orifice passage 58 is held in communication with the primary fluid chamber 42 through a communication hole 60 formed in the outer peripheral portion of the orifice member 38 to one side in the circumferential direction (around to the left in FIG. 2) of the divider rubber 56 affixed in the circumferential groove 52. The other end of the orifice passage 58 is held in communication with the equilibrium chamber 44 through a communication hole 62 bored through the bottom portion of the circumferential groove 52 to the other side in the circumferential direction (around to the right in FIG. 2) of the divider rubber 56. In this embodiment, the passage length and passage cross-sectional area of the orifice passage 58 are established and modified such that, based on flow action, e.g. resonance action, of fluid caused to flow through the orifice passage 58, there is produced effective vibration damping action of low-frequency, large-amplitude vibration on the order of ±0.1-1.0 mm and 10 Hz, such as engine shake for example.

As a result, when shake or other low-frequency, large-amplitude vibration is input across the first mounting member 12 and the second mounting member 14, fluid flow through the orifice passage 58 between the primary fluid chamber 42 and the auxiliary fluid chamber 48 is created on the basis of relative pressure fluctuations produced between the two chambers 42, 44, whereby there is achieved a high level of damping effect based on flow action, e.g. resonance action, of the fluid induced to flow through the orifice passage 58.

A small mounting bolt 64 is integrally disposed downward from the center of the connector member 28 which has been vulcanization bonded to the center portion of the diaphragm 26. A drive rod 66 extending in the generally vertical direction is secured threaded onto this mounting bolt 64.

Underneath the second mounting member 14 is disposed an electromagnetic actuator 68 as the electromagnetic actuating means. In the electromagnetic actuator 68 pertaining to this embodiment, it is possible to employ known construction, for example, that of the actuator taught in JP-A-2003-339145, and as such a detailed description thereof is omitted. The actuator 68 has a construction in which a tubular yoke member 72 as the stationary element is disposed spaced apart to the outside of a movable member 70 as the movable element, with the movable member 70 and the yoke member 72 being actuated in the axial direction to undergo relative displacement on the basis of the electromagnetic force produced between the movable member 70 and the yoke member 72 by input of current through a coil 74.

Figure 3:
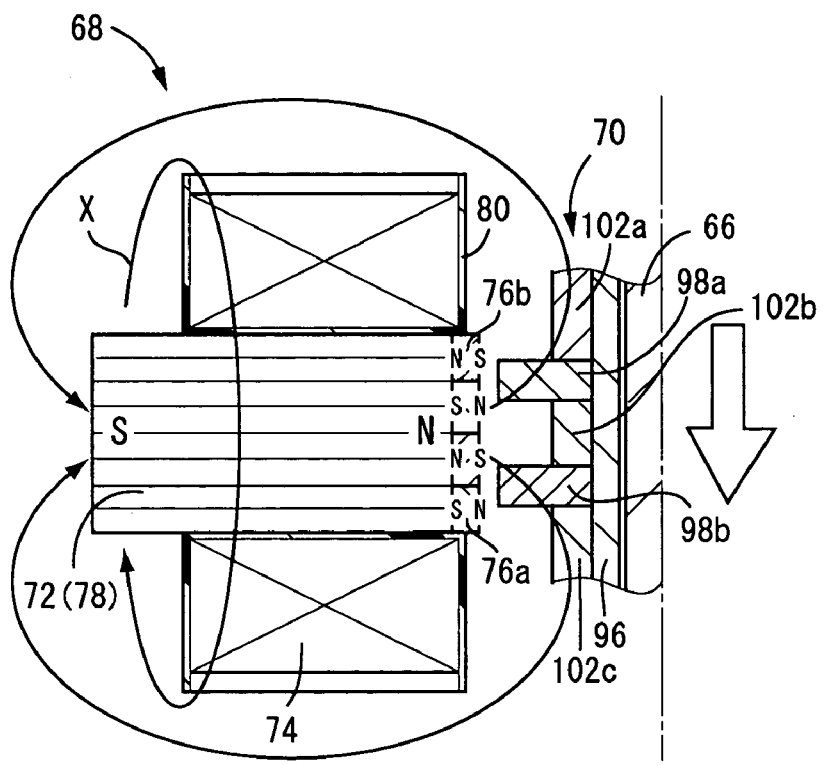
FIG. 3 is a schematic illustration showing one operating state of an electromagnetic actuator of the engine mount of FIG. 1.

Specifically, the yoke member 72 is formed by stacked plates composed of a plurality of plates of ferromagnetic material stacked together in the vertical direction in FIGS. 1 and 3. In the drawings, the stacked structure is represented in simplified form, with hatching omitted. While not shown in the drawings, the yoke member 72 has a structure in which a pair of magnetic pole portions 78, 78 project facing one another on the inner peripheral face from a peripheral magnetic path of annular configuration. The coil 74 is wound as the coil member around the pair of magnetic pole portions 78, 78. The perimeter of each coil 74 is covered by an electrical insulation layer 80.

On each the inwardly projecting end faces of the pair of magnetic pole portions 78, 78 in the yoke member 72 are formed a plurality (four in this embodiment) of permanent magnets 76, disposed in opposition spaced a predetermined distance apart. These permanent magnets 76 are magnetized in the axis-perpendicular direction (horizontally in FIG. 1). In this embodiment in particular, two types of permanent magnet 76, namely permanent magnets 76*a* whose inner peripheral face is the N pole face and whose outer peripheral face is the S pole face, and permanent magnets 76*b* whose inner peripheral face is the S pole face and whose outer peripheral face is the N pole face, are employed. The plurality of permanent magnets 76*a* and permanent magnets 76*b* are affixed to the inner peripheral face of the yoke member 72 (inwardly projecting end face of the magnetic pole portion 78) in alternating fashion situated adjacently to one another in the axial direction. With this arrangement, the magnetic pole faces (portions) of the plurality of permanent magnets 76 differ from one another in the axial direction.

A fixed housing 82 is disposed to the outer peripheral side of the yoke member 72. The fixed housing 82 has a generally inverted cup shape and is constituted to include a large-diameter tubular portion 84 extending in the axial direction and an upper base portion 86 of generally flat plate shape integrally affixed to the upper end of the tubular portion 84. The yoke member 72 is fastened press-fit into the axially medial portion of the tubular portion 84, inserted therein and the tubular portion 84 then subjected to a diameter reduction process, or the like to secure it within the fixed housing 82 so as to extend out in the axis-perpendicular direction.

At the outer peripheral portion of the upper base portion 86 are fixedly installed a plurality of support bolts 88 extending a predetermined length in the axial direction, with metal upper and lower plate springs 90*a*, 90*b* disposed on the support bolts 88. Each plate spring 90*a*/90*b* has a thin annular shape formed of spring steel or the like. Optionally, by forming an appropriate slit or the like, it is possible to adjust the substantial effective spring length and to tune spring characteristics. Besides the metal plate springs shown by way of example, it would also be acceptable to employ plate shaped elastic material of resin or synthetic resin.

The upper and lower plate springs 90*a*, 90*b* are positioned spaced apart in the axial direction within the fixed housing 82 each disposed so as to extend out in the axis-perpendicular direction, by means of insertion on the support bolts 88 of the fixed housing 82 via a plurality of spacers 92, 92, 92, and threadably securing the support bolt 88 with a nut. A pair of insertion holes 94, 94 are formed in the diametrically medial portion of the plate springs 90*a*, 90*b*, and when installing the plate springs 90*a*, 90*b* in the preceding manner the coil 74 is movably inserted through the insertion holes 94 to effectively assure elastic deformation of the plate springs 90*a*, 90*b*.

The movable member 70 inserts internally on the inner peripheral side of the yoke member 72 disposed generally coaxially therewith. The movable member 70 is constituted to include a fixed sleeve 96 of elongated tubular shape extending straight in the axial direction and upper and lower magnetic rings 98, 98 of thin annular shape, and is fabricated using ferromagnetic material such as ferric metal. In proximity to the upper end of the movable member 70 is integrally formed a collar 100. The fixed sleeve 96 slips onto the outside of the drive rod 66 and is fastened to the drive rod 66 by means of a lock nut threaded onto the lower end of the drive rod 66. Then the upper plate spring 90*a*, an upper spacer 102*a*, the upper magnetic ring 98*a*, a middle spacer 102*b*, the lower magnetic ring 98*b*, a lower spacer 102*c*, the lower plate spring 90*b*, and a washer 104 are slipped onto the outside of the fixed sleeve 96, so as to be stacked in the axial direction with respect to the collar 100 of the fixed sleeve 96. A fastener nut 106 is then threaded onto the bottom end of the fixed sleeve 96, whereby with the pair of magnetic rings 98*a*, 98*b* disposed spaced apart in the axial direction, the upper and lower plate springs 90*a*, 90*b*, the upper, middle and lower spacers 102*a*, 102*b*, 102*c*, the upper and lower magnetic rings 98*a*, 98*b*, and the washer 104 are sandwiched between the collar 100 of the fixed sleeve 96 and the fastener nut 106 in the axial direction, and secured thereby to the fixed sleeve 96 and hence the drive rod 66.

The upper base portion 86 of the fixed housing 82 is inserted into a tubular caulking portion 108 integrally formed at the lower end of the second mounting member 14 and subjected to a caulking process, whereby the yoke member 72 is fastened to the second mounting member 14 through the agency of the fixed housing 82. As a result, the electromagnetic actuator 68 is attached to the second mounting member 14 at a location below the diaphragm 26, and the electromagnetic actuator 68 and the connector member 28 disposed in the center portion of the diaphragm 26 are linked by the drive rod 66.

By means of this arrangement, the drive rod 66 with the attached movable member 70 is inserted into the yoke member 72, with the movable member 70, the drive rod 66, and the yoke member 72 disposed generally on the same center axis. On the basis of the fact that the movable member 70 and the yoke member 72 are elastically linked by the pair of plate springs 90*a*, 90*b* via the fixed housing 82, the drive rod 66 and the yoke member 72 are permitted to undergo elastic relative displacement in the axial direction on generally the same center axis. Also, the movable member 70 is situated a predetermined distance apart in the axis-perpendicular direction, in opposition to the plurality of permanent magnets 76 affixed to the inner peripheral face of the yoke member 72. In particular, the projecting distal end face of the magnetic ring 98 of the movable member 70 and the magnetic pole faces of the plurality of permanent magnets 76 are situated opposite to each other in a slight distance apart in the axis-perpendicular direction.

Accordingly, the partition wall member 40 pertaining to this embodiment is constituted to include a main support ring 110, an annular guide member 112, and an annular rubber elastic body 114. This main support ring 110 serving as the annular fastener member has a large-diameter, generally annular shape, constituting the outer peripheral portion of the partition wall member 40 which comprises the circumferential groove 52, the seal rubber 54, and the divider rubber 56. That is, the main support ring 110 is disposed with the outer peripheral edge portion thereof sandwiched between the metal sleeve 36 and the stepped portion 20 of the second mounting member 14, whereby it is fixedly supported in fluid-tight fashion on the second mounting member 14, with the inner peripheral edge portion thereof projecting diametrically inward by a predetermined length.

The guide member 112 serving as an annular guide member has a thin, generally annular plate shape. In this embodiment in particular, the guide member 112 is fabricated using synthetic resin material, for example, polyacetal or polytetrafluoroethylene, which has a coefficient of rebound lower than the coefficient of rebound of a member consisting of iron or other metal material, while having a sliding friction lower than the sliding friction of natural rubber or other rubber material. The synthetic resin material will preferably be endowed with a heat resistance temperature and thickness dimension sufficient to withstand the vulcanization molding temperature of the annular rubber elastic body 114 described later.

A center hole in the guide member 112 serves as a through-hole 116 of generally circular shape. On the lip of the opening of the through-hole 116 is integrally formed a guide sleeve 118 of generally round tubular shape projecting axially upward. The circumferential surface of the guide sleeve 118 is generally co-planar with the through-hole 116.

The main support ring 110 is disposed on the guide member 112, situated spaced apart diametrically outward therefrom, but on generally the same center axis. The guide member 112 is constituted as the center portion of the partition wall member 40, and the through-hole 116 is positioned on generally the same center axis as the mounting body. The annular rubber elastic body 114 is disposed between the guide member 112 and the main support ring 110.

The annular rubber elastic body 114 serving as the elastic support member has a generally annular plate shape extending with a generally constant cross section around the entire circumference in the circumferential direction, and is formed by means of an elastically deformable rubber film. The outer peripheral edge of the annular rubber elastic body 114 is vulcanization bonded to the inner peripheral edge of the guide member 112. With this arrangement, the annular rubber elastic body 114 is disposed so as to extend out at an approximately right angle to the direction of opposition of the primary fluid chamber 42, the auxiliary fluid chamber 48, and the equilibrium chamber 44, as well as forming an integrally vulcanization-molded component comprising the main support ring 110 and the guide member 112. That is, the annular rubber elastic body 114 is constituted as the diametrically medial portion of the partition wall member 40, as well as constituting part of the wall of the pressure-receiving chamber composed of the primary fluid chamber 42 and the auxiliary fluid chamber 48. The annular rubber elastic body 114 is integrally formed with the divider rubber 56 and the seal rubber 54 formed covering the main support ring 110.

With this arrangement, the annular rubber elastic body 114 is disposed so as to extend with a generally constant cross section around the entire circumference in the circumferential direction about the center axis of the guide member 112 (center axis of the mounting), with the main support ring 110, the guide member 112, and the annular rubber elastic body 114 arranged concentrically encircling the center axis of the mounting. The guide member 112 is elastically supported on the main support ring 110, and hence on the second mounting member 12, via the annular rubber elastic body 114.

The characteristic frequency of the annular rubber elastic body 114 is tuned to the frequency range of vibration to be damped in a frequency range higher than the tuning frequency of the orifice passage 58. Specifically, the characteristic frequency, based on deformation of the annular rubber elastic body 114, is tuned so that resonance of the annular rubber elastic body 114 is effectively produced in response to high-frequency, small-amplitude vibration such as drive rumble, on the order of ±0.01-0.02 mm and 60-120 Hz, for example.

An oscillation plate 120 is disposed within the through-hole 116 of the guide member 112. The oscillation plate 120 is fabricated of metal, synthetic resin or other rigid material, and has a main plate portion 122 of generally circular plate shape, and at the outer peripheral edge of the main plate portion 122, an integrally formed rim portion 124 that projects to both sides in the axial direction. The outside diameter dimension of the oscillation plate 120 is established so as to be slightly smaller than the diameter dimension of the through-hole 116 (the inside diameter dimension of the guide sleeve 118). The oscillation plate 120 is inserted into the guide sleeve 118.

The oscillation plate 120 pertaining to this embodiment inserts into the through-hole 116 with a slight gap dimension that substantially does not form a fluid passage. This gap dimension: D (mm), in other words the diametrical spacing distance: D (mm) between the outer peripheral face of the main plate portion 122 and rim portion 124 that make up the oscillation plate 120 on the one hand, and the inner peripheral face of the guide member 112 comprising the guide sleeve 118 on the other, is not particularly limited, but may be established, for example, such that $D \leq 0.5$, preferably $0.1 \leq D \leq 0.3$. That is, a continuous or discontinuous slight gap extending generally around the entire circumference is formed on the diametrically opposed outer peripheral face of the oscillation plate 120 and inner peripheral face of the guide member 112.

With the aforementioned arrangement, the oscillation plate 120 comprising the main plate portion 122 and the rim portion 124, while being guided by the guide sleeve 118, is made relatively displaceable in the axial direction. Specifically, the main plate portion 122 is disposed within the through-hole 116 so as to spread out in generally the axis-perpendicular direction on the one hand, and the rim portion 124 is inserted a sufficient length in the axial direction into the through-hole 116 of the guide member 112 comprising the guide sleeve 118, with at least one end of rim 124 projecting outwardly in the axial direction from the lower end of the guide member 112 and upper end of the guide sleeve 118.

A caulking portion 126 is disposed projecting upward in the center of the connector member 28. This caulking portion 126 is passed through a fastening hole 128 bored through the center of the oscillation plate 120, and the caulking portion 126 then subjected to a caulking process to fasten together fluid-tightly the oscillation plate 120 and the connector member 28. Specifically, the oscillation plate 120 is connected to the actuator 68 via the connector member 28 and the drive rod 66. As will be apparent from this fact as well, the movable member 70 constituting the output member of the electromagnetic actuator 68 is connected to the oscillation plate 120 via the drive rod 66 and the connector member 28, and the drive rod 66 is disposed passing through the center portion of the diaphragm 26 in fluid-tight fashion. The connector rod connecting the oscillation plate 120 and the movable member 70 of the electromagnetic actuator 68 is constituted to include the drive rod 66 and the connector member 28.

As depicted in schematic form in FIG. 3, in the engine mounting 10 of the construction described above, by means of applying current through the coil 74 of the electromagnetic actuator 68 in the X direction shown in FIG. 3 for example, an N pole is produced at the inward side (right in FIG. 3) in the diametrical direction of the yoke member 72, while an S pole is produced at the other side (left in FIG. 3) in the diametrical direction. When current flows in the opposite direction through the coils 74, 74, the N and S poles are reversed with respect to the yoke member 72. Thus, by applying alternating current through the coil 74, the N poles or the S poles of the plurality of permanent magnets 76 attached to the yoke member 72 are weakened while opposite poles are strengthened, in alternating fashion. As a result, magnetic force directed to one side in the axial direction and magnetic force directed to the other side are caused to act in alternating fashion on the magnetic rings 98, 98 of the drive rod 66, so that the drive rod 66 is actuated in reciprocating fashion in both the up and down directions, from a stable location in the absence of applied current (the location shown in FIG. 1). The magnetic ring 98 may have a magnetic pole on the face opposed to a permanent magnet 76, whereby an even higher level of actuating force can be obtained.

For instance, by means of carrying out adaptive control or other such feedback control using the power unit engine ignition signal as a reference signal and using the vibration detection signal of a component to be damped (e.g. the vehicle body) as an error signal, flow of current to the coil 74 is controlled, whereby the drive rod 66 is excitation driven in the axial direction. As a result, when low-frequency vibration such as engine shake is input for example, by means of drive control of the oscillation plate 112 such that pressure fluctuations are effectively produced between the pressure receiving chamber composed of the primary fluid chamber 42 and the auxiliary fluid chamber 48 and the equilibrium chamber 44, adequate flow of fluid through the orifice passage 58 is assured. Thus, vibration damping effect on the basis of flow action, e.g. resonance action, of fluid through the orifice passage 58 is more advantageously achieved.

When medium-frequency, medium-amplitude vibration such as idling vibration is input for example, the internal pressure in the pressure receiving chamber composed of the primary fluid chamber 42 and the auxiliary fluid chamber 48 can be controlled on the basis of excitation driving of the oscillation plate 120 that is produced by acting drive force corresponding to the vibration on the oscillation plate 120. Thus, active and dynamic vibration damping action against medium-frequency vibration is effectively achieved.

In this embodiment in particular, the resonance frequency of the fluid caused to flow through the through-hole 50 of the orifice member 38 is tuned to medium-amplitude vibration (e.g. idling vibration) where there is intended to produce dynamic vibration damping action by means of the oscillation plate 120. This arrangement permits that pressure fluctuations produced in the primary fluid chamber 42 and the auxiliary fluid chamber 48 on the basis of excitation driving of the oscillation plate 120, when exerted on the primary fluid chamber 42 through the through-hole 50, are transmitted efficiently utilizing the resonance action etc. of the fluid caused to flow through the through-hole 50. By actively and dynamically controlling pressure fluctuations of the primary fluid chamber 42 and the auxiliary fluid chamber 48, the vibration transmission characteristics of the first mounting member 12 and the second mounting member 14 are adjusted, and the desired vibration damping action is advantageously achieved.

Accordingly, in the engine mount 10 of this embodiment, the guide member 112 is elastically connected and supported via the annular rubber elastic body 114 on the main support ring 110, and hence on the second mounting member 14, whereby even if the oscillation plate 120 and the guide member 112 come into contact with one another in association with displacement of the oscillation plate 120 in the axial direction, the reaction force exerted on the oscillation plate 120 on the basis of this contact is effectively suppressed on the basis of elastic deformation of the annular rubber elastic body 114.

That is, since the oscillation plate 120 is disposed on the guide member 112 with a slight gap, and since the oscillation plate 120 stably undergoes displacement in the axial direction, pressure leakage from the pressure receiving chamber through the gap is accordingly suppressed. Further, on the basis of the fact that the desired oscillation force is achieved, the desired vibration damping action is consistently achieved.

Additionally, when the movable member 70 of the electromagnetic actuator 68 is linked to the oscillation plate 120 via the connector member 28 and the drive rod 66, and the oscillation plate 120 is inserted into the through-hole 116 of the guide member 112, even in the event that part of the oscillation plate 120 should contact the edge of the through-hole 116, reaction force of the oscillation plate 120 is absorbed by the elastic action of the annular rubber elastic body 114, and axial displacement of the oscillation plate 120 is realized smoothly. As a result, the dimensions of the various components such as the oscillation plate 120 and the guide member 112, and positioning of the electromagnetic actuator 68 comprising the movable member 70 with respect to the mounting body, may be established with high accuracy, and the desired oscillation force may be achieved even without the formation of a slight gap between the oscillation plate 120 and the through-hole 116, so that dimensions and positioning thereof can be established easily without an excessive degree of exactitude. Thus, production efficiency and production costs can be advantageously reduced.

When high-frequency vibration is input to the pressure receiving chamber during driving, since pressure fluctuations of the pressure receiving chamber composed of the primary fluid chamber 42 and the auxiliary fluid chamber 48 are very small, the pressure fluctuations of the pressure receiving chamber are absorbed and reduced by means of deformation of the annular rubber elastic body 114. In particular, since the annular rubber elastic body 114 is formed about the center axis of the guide member 112 and can advantageously ensure effective surface area, it can advantageously undergo following deformation in response to pressure fluctuations in the high frequency range in the pressure receiving chamber, suppressing pressure fluctuations of the pressure receiving chamber. Additionally, by tuning the characteristic frequency of the annular rubber elastic body 114 to the high-frequency vibration to be damped, following deformation of the annular rubber elastic body 114 on the basis of resonance action is more advantageously achieved. Thus, during input of such high-frequency vibration, even if the orifice passage 58 is substantially blocked, marked pressure fluctuations of the pressure receiving chamber are avoided by means of the annular rubber elastic body 114, so that excellent vibration damping performance is exhibited by means of effective vibration isolating action based on low spring characteristics.

In this embodiment, on the basis of thermal shrinkage due to vulcanization molding of the annular rubber elastic body 114, acting force is exerted on the guide member 112 and the main support ring 110 in the direction of proximity to one another in the diametrical direction. However, on the basis of the fact that the annular rubber elastic body 114 is of generally annular plate shape extending continuously with unchanging cross sectional shape in the circumferential direction about the center axis of the guide member 112, and that the annular rubber elastic body 114 undergoes uniform diameter-reducing shrinkage in its entirety in the circumferential direction, the center axis of the guide member 112 is favorably maintained on the center axis of the mounting body. Thus, the slight gap between the guide member 112 and the oscillation plate 120 is established with high accuracy, and improved oscillation force and prevention of pressure leakage from the pressure-receiving chamber are more favorably achieved.

In this embodiment, the upper portion of the drive rod 66 is fastened to the oscillation plate 120 which is supported on the partition wall member 40 (guide member 112), and additionally the medial portion and lower portion of the drive rod 66 are supported on the upper and lower plate springs 90a, 90b fastened to the movable member 70, whereby positioning of the drive rod 66 in the axial and axis-perpendicular directions may be realized with high accuracy, and thus more advantageously improve the drive efficiency of the oscillation plate 120.

Additionally, in this embodiment, by means of inserting the oscillation plate 120 into the through-hole 116, the guide member 112 is disposed encircling the oscillation plate 120 on the one hand. Further, the connector member 28 connected to the oscillation plate 120, the drive rod 66, and the movable member 70 in the electromagnetic actuator 68 are each constituted as separate elements, and are connected together by means of a bolt. Thus, for example, while the parts are immersed in non-compressible fluid, by attaching the orifice member 38 and the partition wall member 40 to the integrally vulcanization molded component of the diaphragm 26 furnished with the second mounting member 14 and the connector member 28 with the attached oscillation plate 120, and then attaching the integrally vulcanization molded component of the rubber elastic body 16 equipped with the metal sleeve 36 and the first mounting member 12, it becomes possible to insert the oscillation plate 120 into the through-hole 116 of the guide member 112 in the partition wall member 40 as well as form the primary fluid chamber 42 and auxiliary fluid chamber 48 having non-compressible fluid sealed therein. Then, working under air, it is possible to connect the connector member 28 and the electromagnetic actuator 68 via the drive rod 66, by means of bolting them. As a result, the engine mounting 10 which pertains to the this embodiment can be advantageously realized by a simple manufacturing process.

While the present invention has been described in detail in its presently preferred embodiment, for illustrative purpose only, it is to be understood that the invention is by no means limited to the details of the illustrated embodiment, but may be otherwise embodied. It is also to be understood that the present invention may be embodied with various changes, modifications and improvements which may occur to those skilled in the art, without departing from the spirit and scope of the invention.

Figure 4:
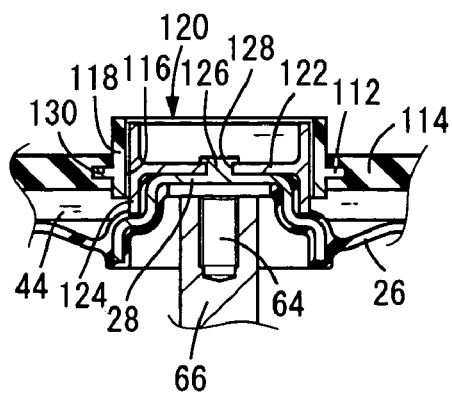
FIG. 4 is a fragmentary cross sectional view showing a principle part of the present invention of construction according to another preferred embodiment.

For instance, in the illustrated embodiment, the guide member 112 is affixed to the annular rubber elastic body 114 by means of vulcanization bonding in association with integral vulcanization molding with the annular rubber elastic body 114, but is not limited to this arrangement. Specifically, as depicted in FIG. 4 for example, the annular rubber elastic body 114 and the guide member 112 could be formed as separate elements, a fastening groove 130 formed extending a predetermined length in the circumferential direction on the inner peripheral edge of the annular rubber elastic body 114, and the elasticity of the annular rubber elastic body 114 utilized to fit the outer peripheral edge of the guide member 112 into the fastening groove 130 to produce a fastening mechanism that includes the outer peripheral edge of the annular rubber elastic body 114 and the fastening groove 130 of the guide member 112, so that the guide member 112 and the annular rubber elastic body 114 are fastened together.

Also, whereas in the embodiment hereinabove the guide member 112 is formed using synthetic resin material so that low friction and smooth sliding are ensured at the inner peripheral face situated in opposition in the axis-perpendicular direction to the outer peripheral face of the oscillation plate 120 in the guide member 112, it would be acceptable instead, for example, to cover the outer peripheral face of the oscillation plate 120 and/or the inner peripheral face of the guide member 112 with a film member of polytetrafluoroethylene or the like, or to interpose a sliding sleeve between the opposed faces of the oscillation plate 120 and the guide member 112, in order to ensure low friction etc. at the outer peripheral face of the oscillation plate 120 and the inner peripheral face of the guide member 112.

Also, whereas in the preceding embodiment the guide member 112, the oscillation plate 120 and the drive rod 66 are disposed concentrically encircling the center axis of the mounting, depending on the required manufacturing conditions and the like, they could be disposed at locations away from the center axis of the mounting.

It would also be possible to employ a construction wherein, for example, a permanent magnet 76 is disposed on the stationary element side in the electromagnetic actuator as depicted in exemplary fashion, and the moving element side constitutes a movable member 70 consisting of ferromagnetic material, whereby the N pole and S pole of the stationary element side increase and decrease in alternating fashion by means of the magnetic field created when current is passed through the coil 74, causing the movable member 70 to undergo reciprocation (the basic principle of this design are known, having been disclosed, for example, in JP-A-2003-339145, and as such will not be described in detail here); or to employ an electromagnetic actuator of any of various other known type, such as those disclosed in JP-A-2000-213586 or 2001-1765.

That is, the shape, size, material, and mode of disposition of the aforementioned yoke member 72, movable member 70, permanent magnet 76, coil 74 and so on in the electromagnetic actuator 68 are in no way limited, and may be modified appropriately by those who skilled in the art.

For example, whereas in the embodiment hereinabove, with the permanent magnets 76 disposed on the yoke member 72, permanent magnets 76 magnetized in the axis-perpendicular direction are employed, but it would be possible to instead employ permanent magnets magnetized in the axial direction.

Additionally, whereas in the embodiment hereinabove the movable member 70 is formed of ferromagnetic material, it would also be possible to dispose a permanent magnet 76 in a portion of the movable member 70 or to construct the movable member 70 from a permanent magnet 76, while taking into consideration the action of the field produced by the permanent magnets 76 disposed on the yoke portion.

Also, the shape, size, construction, and number of the primary fluid chamber 42, auxiliary fluid chamber 48, equilibrium chamber 44, orifice passage 58 and so are not limited to those illustrated herein by way of example.

For example, whereas in the embodiment hereinabove, the orifice passage 58 is formed by superposing the orifice member 38 onto the partition wall member 40, but it would be acceptable to dispense with the orifice member 38, instead providing a groove that opens onto the outer peripheral face of the partition wall member 40 and extends a predetermined length in the circumferential direction with closure, by covering it with the peripheral wall of the second mounting member 14. The orifice member 38 is not indispensable, nor is it always necessary to provide the auxiliary fluid chamber 48.

The specific structure and dimensions of the orifice passage 58 are not limited in any way, and may be tuned depending on the required vibration damping characteristics. It is sufficient for the orifice passage 58 to connect the pressure receiving chamber and the equilibrium chamber 44; in cases where the pressure receiving chamber is composed of the primary fluid chamber 42 and the auxiliary fluid chamber 48 as in the illustrated example, the equilibrium chamber may communicate with the primary fluid chamber 42, or the equilibrium chamber 44 may communicate with the auxiliary fluid chamber 48.

Apart from the engine mounting described herein by way of example, the invention is applicable generally to dynamic vibration damping apparatus; for example, it could be reduced to practice as a fluid-filled dynamic vibration damping apparatus in a tubular engine mounting employed as an FF type automotive engine mounting, or utilized similarly as a vibration damping connector or vibration damping support interposed between two members such as the power unit and body as described herein by way of example, or as a damper for mounting onto a vibrating target to be damped. Specifically, the fluid-filled dynamic vibration damping apparatus may be deployed by fastening the second mounting member thereof by means of a bracket to the vibrating target to be damped, and a mass member of suitable mass attached to a mounting plate portion provided to the first mounting member thereof, to realize a dynamic vibration damping apparatus.

Additionally, the invention may be reduced to practice similarly in an automotive body mount or member mount, or mounts, dampers, and other vibration damping apparatus in various non-automotive apparatus, and similarly in actuators used in such vibration damping apparatus.

What is claimed is:

1. A fluid-filled active damping apparatus comprising:
   a first mounting member;
   a second mounting member;
   a rubber elastic body elastically connecting the first and second mounting members;
   a pressure receiving chamber filled with a non-compressible fluid, whose wall is partially defined by the rubber elastic body, and subjected to input of vibration;
   an oscillation plate defining an another portion of the wall of the pressure receiving chamber, and supported in a displaceable fashion;
   an electromagnetic actuator disposed on one side of the oscillation plate remote from the pressure receiving chamber, with an output member thereof connected to the oscillation plate, the oscillation plate being driven by means of current applied to the electromagnetic actuator to thereby control pressure in the pressure receiving chamber;
   a rigid annular guide member disposed about the oscillation plate with a slight gap interposed therebetween, such that the annular guide member is displaceable in an axial direction with respect to the oscillation plate;
   an elastic support member elastically interposed between and connected to the annular guide member and the second mounting member so that the annular guide member is elastically supported by and connected to the second mounting member via the elastic support member;
   an equilibrium chamber filled with the non-compressible fluid, whose wall is partially defined by a flexible diaphragm to readily permit change in volume; and
   an orifice passage for permitting a communication between the pressure receiving chamber and the equilibrium chamber,
   wherein the rigid annular guide member is disposed coaxially about the oscillation plate, and the slight gap between the annular guide member and the oscillation plate is made small enough to prevent flow of the fluid therethrough.

2. A fluid-filled active damping apparatus according to claim 1, wherein the elastic support member extends with generally constant cross-sectional shape around an entire circumferential direction about a center axis of the annular guide member.

3. A fluid-filled active damping apparatus according to claim 1, wherein at least one of an outer peripheral face of the oscillation plate and an inner peripheral face of the annular guide member, which are situated in opposition to each other with the slight gap therebetween, is formed of synthetic resin material.

4. A fluid-filled active damping apparatus according to claim 1, wherein the annular guide member and the elastic support member are formed independently from each other, and a fastening mechanism is provided to affix an outer peripheral edge of the annular guide member and an inner peripheral edge of the elastic support member to each other, utilizing an elastic behavior of the elastic support member.

5. A fluid-filled active damping apparatus according to claim 1, wherein the oscillation plate is of a construction integrally having a main plate portion of disk shape, and a rim portion of tubular shape rising up in the axial direction at an outer peripheral edge of the main plate portion.

6. A fluid-filled active damping apparatus according to claim 1, wherein a natural frequency of the elastic support member is set to a frequency range higher than a tuning frequency of the orifice passage.

7. A fluid-filled active damping apparatus according to claim 1, wherein the flexible diaphragm is affixed fluid-tightly at an outer peripheral edge thereof to the second mounting member, and a connector rod connecting the output member of the electromagnetic actuator and the oscillation plate is disposed fluid-tightly passing through a center portion of the flexible diaphragm.

8. A fluid-filled active damping apparatus according to claim 1, wherein an annular fastener member is disposed to an outer peripheral side of the annular guide member and spaced apart therefrom, and wherein the annular guide member is affixed to an inner peripheral edge of the elastic support member, and the annular fastener member is affixed to an outer peripheral edge of the elastic support member so that the annular fastener member is fluid-tightly fastened to the second mounting member.

* * * * *